US008045296B1

(12) United States Patent
Roen

(10) Patent No.: US 8,045,296 B1
(45) Date of Patent: Oct. 25, 2011

(54) ALIGNED COVERLAY AND METAL LAYER WINDOWS FOR INTEGRATED LEAD SUSPENSIONS

(75) Inventor: Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 969 days.

(21) Appl. No.: 11/947,247

(22) Filed: Nov. 29, 2007

(51) Int. Cl.
*G11B 5/48* (2006.01)
*G11B 5/60* (2006.01)

(52) U.S. Cl. ............... 360/245.8; 360/245.9; 360/246
(58) Field of Classification Search ............. 360/245.8, 360/245.9, 246
See application file for complete search history.

(56) References Cited

U.S. PATENT DOCUMENTS

| | | | |
|---|---|---|---|
| 4,906,803 A | 3/1990 | Albrechta et al. | |
| 5,666,717 A | 9/1997 | Matsumoto et al. | |
| 5,839,193 A | 11/1998 | Bennin et al. | |
| 5,995,329 A * | 11/1999 | Shiraishi et al. | 360/245.9 |
| 6,380,493 B1 | 4/2002 | Morita et al. | |
| 6,576,148 B1 * | 6/2003 | Shum et al. | 216/13 |
| 6,631,052 B1 * | 10/2003 | Girard et al. | 360/245.8 |
| 6,673,256 B2 | 1/2004 | Takasugi | |
| 6,891,700 B2 | 5/2005 | Shiraishi et al. | |
| 7,489,479 B2 * | 2/2009 | Arya et al. | 360/245.9 |
| 7,813,082 B2 * | 10/2010 | Rice et al. | 360/245.9 |
| 7,813,084 B1 * | 10/2010 | Hentges | 360/245.9 |
| 7,826,177 B1 * | 11/2010 | Zhang et al. | 360/245.3 |
| 2002/0181156 A1 | 12/2002 | Shiraishi et al. | |
| 2002/0181157 A1 | 12/2002 | Serizawa et al. | |
| 2003/0026078 A1 | 2/2003 | Komatsubara et al. | |
| 2003/0053257 A1 | 3/2003 | Wada et al. | |
| 2005/0248885 A1 * | 11/2005 | Funada et al. | 360/245.9 |
| 2007/0230059 A1 * | 10/2007 | Ota et al. | 360/245.9 |

* cited by examiner

*Primary Examiner* — Jefferson Evans
(74) *Attorney, Agent, or Firm* — Faegre & Benson LLP

(57) ABSTRACT

An integrated lead flexure having a spring metal layer, a dielectric insulating layer on a side of the spring metal layer, a conductor layer on the side of the insulating layer opposite the spring metal layer and a coverlay on the side of the conductor layer opposite the insulating layer. The flexure further includes base region, a gimbal region extending from the base region, and a tail region extending from the base region opposite the gimbal region. The conductor layer includes terminal pads at the tail region and head bond pads at the gimbal region. Traces in the conductor layer extend between the terminal pads and the head bond pads across the tail, base and gimbal regions. One or more spring metal windows in the spring metal layer at the tail region are adjacent to substantial portions of at least some of the traces. One or more coverlay windows in the coverlay at the tail region are adjacent to substantial portions of the tail region spring metal windows.

22 Claims, 5 Drawing Sheets

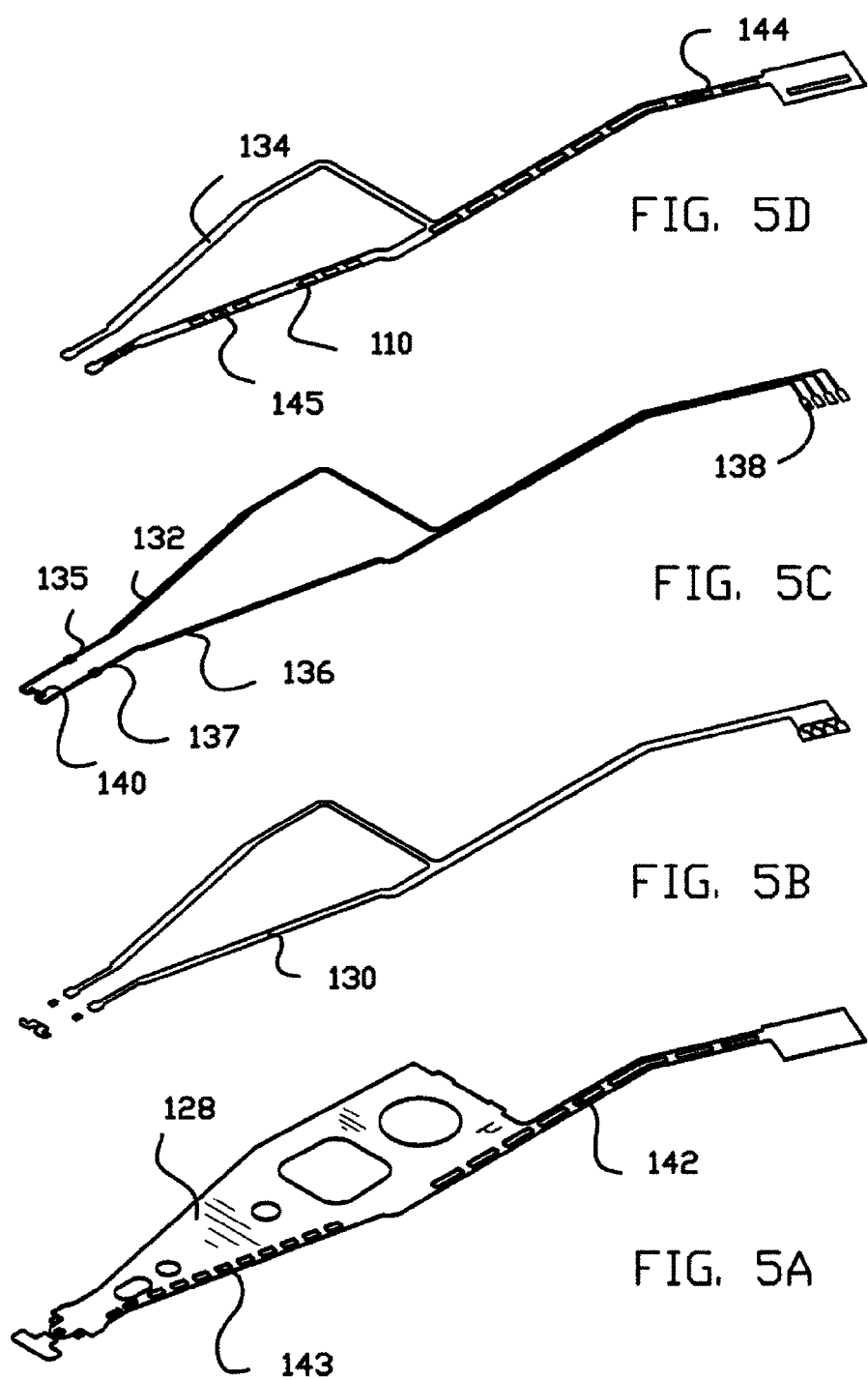

ALIGNED COVERLAY AND METAL LAYER WINDOWS FOR INTEGRATED LEAD SUSPENSIONS

FIELD OF INVENTION

The present invention relates generally to integrated lead or wireless suspensions and components. In particular, the invention is a windowed coverlay structure in combination with a windowed metal layer for an integrated lead suspension or component.

BACKGROUND OF THE INVENTION

Integrated lead or wireless disk drive head suspensions are well known and disclosed, for example, in the Shirashi et al. U.S. Pat. No. 6,891,700 and the Bennin et al. U.S. Pat. No. 5,839,193. Theses devices generally include a flexure mounted to a spring metal load beam. The flexure typically includes a spring metal layer with a plurality of conductors or traces extending between terminal pads on opposite ends of the suspension. A layer of insulating material separates the traces from the underlying spring metal layer. A coverlay or cover coat layer is formed on the side of the traces opposite the insulating layer.

Subtractive and/or additive processes can be used to manufacture these devices. Subtractive manufacturing processes as disclosed, for example, the Bennin et al. U.S. Pat. No. 5,839,193 uses photolithography and etching processes to form the flexure from laminate material stock having a spring metal layer and conductor layer separated by an insulating layer. Additive manufacturing processes as disclosed, for example, in the Matsumoto et al. U.S. Pat. No. 5,666,717 use photolithography, deposition and etching processes to add the insulating layer, conductor layer and other structures to the spring metal layer.

The spring metal layer of the flexure acts as a ground plane for the traces. For a number of reasons, including the relatively thin nature of the insulating layer, the traces and spring metal layer can be electrically coupled. These electrical characteristics can reduce the signal performance characteristics of the traces. Approaches for compensating for the impact of the spring metal layer on the signal performance characteristics are known. For example, the Shirashi et al. U.S. Pat. No. 6,891,700 discloses holes through the spring metal layer of the flexure below the conductors to lower parasitic capacitance. In another example, the Morita et al. U.S. Pat. No. 6,380,493 discloses removing the coverlay from between adjoining conductive lines to reduce capacitance between the lines and improve the high-frequency characteristics of the circuit pattern.

There remains, however, a continuing need for integrated lead structures providing improved signal performance. To be commercially viable any such structures must be capable of being efficiently manufactured.

SUMMARY OF THE INVENTION

The present invention is an integrated lead flexure or suspension including a spring metal layer, a dielectric insulating layer a conductor layer on the insulating layer opposite the spring metal layer and a coverlay on the side of the conductor layer opposite the insulating layer. The flexure or suspension further includes a base region, a gimbal region extending from the base region and a tail region extending from the base region opposite the gimbal region. The conductor layer includes terminal pads at the tail region, head bond pads at the gimbal region and traces extending between the terminal and head bond pads across the tail, base and gimbal regions. The spring metal layer includes one or more spring metal windows adjacent to at least a substantial portion of at least some of the traces at the tail region. The coverlay includes one or more coverlay windows adjacent to at least substantial portions of the tail region spring metal windows.

BRIEF DESCRIPTION OF THE DRAWINGS

FIGS. 5A-5D is an exploded isometric view of the integrated lead head suspension shown in FIG. 4.

DETAILED DESCRIPTION OF THE PREFERRED EMBODIMENTS

Figure 1:
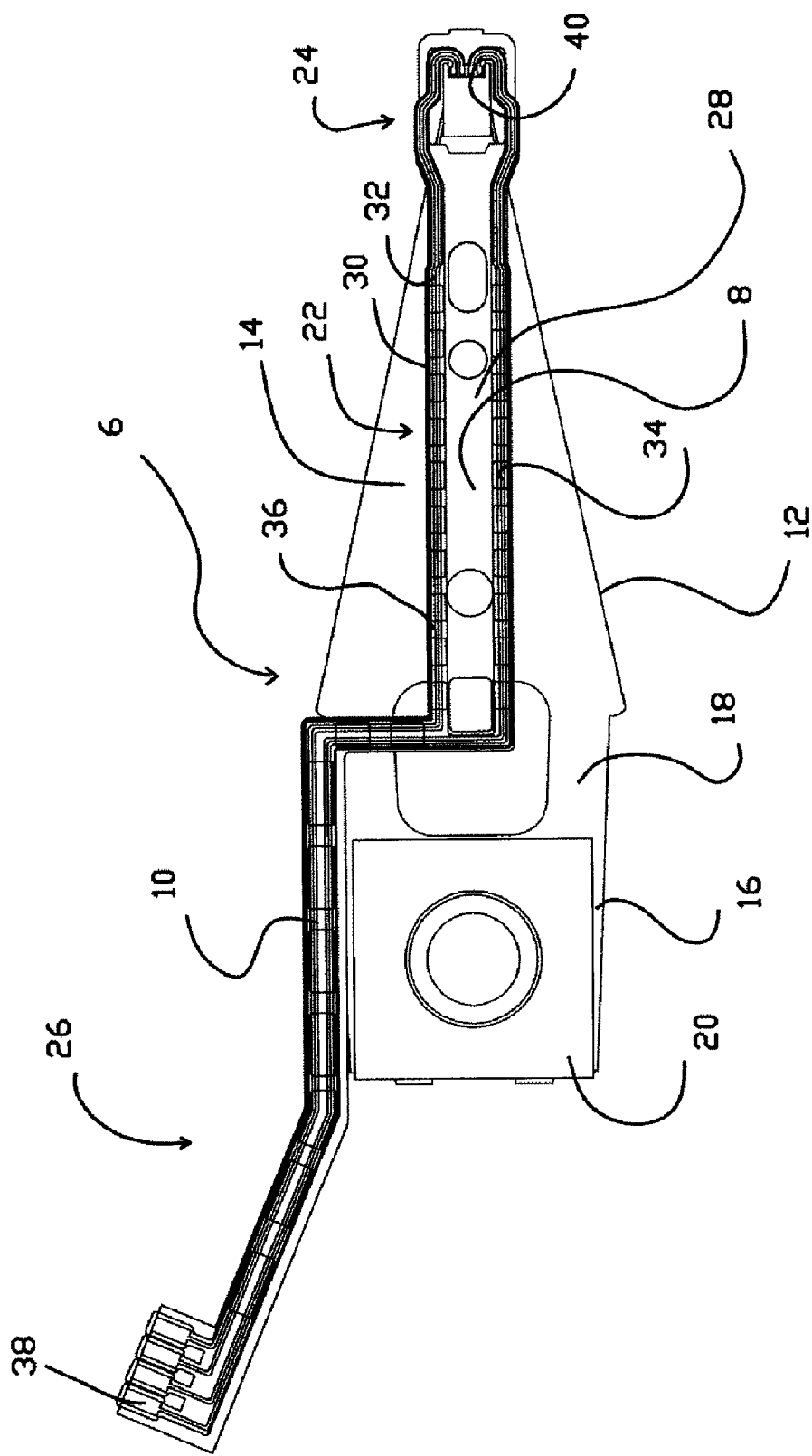
FIG. 1 is plan view of an integrated lead head suspension having a coverlay structure in accordance with the present invention.

FIG. 1 is a plan view of an integrated lead head suspension 6 incorporating a flexure 8 having coverlay structure 10 in accordance with one embodiment of the present invention. Head suspension 6 also includes load beam 12 having beam region 14, mounting region 16 and hinge region 18. A base plate 20 is welded or otherwise attached to mounting region 16.

Flexure 8 includes base region 22, gimbal region 24 extending from base region 22 and tail region 26 extending from base region 22 opposite gimbal region 24. Base region 22 is welded or otherwise attached to beam region 14. As perhaps better shown in FIGS. 2A-2D, flexure 8 is comprised of a spring metal layer 28, an insulating layer 30 on a side of the spring metal layer, a conductor layer 32 on the side of insulating layer 30 opposite spring metal layer 28 and a coverlay 34 on the side of the conductor layer 32 opposite insulating layer 30.

Figure 2D:
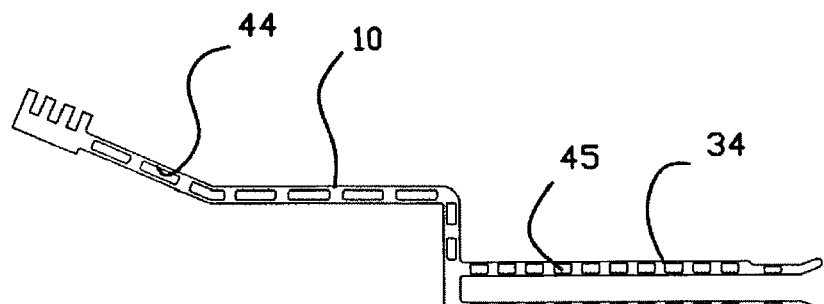
FIGS. 2A-2D is an exploded plan view of the flexure shown in FIG. 1.
Figure 2C:
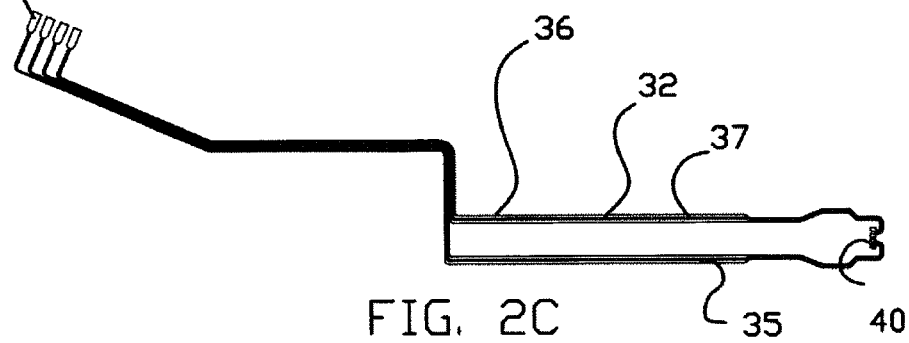
Figure 2B:
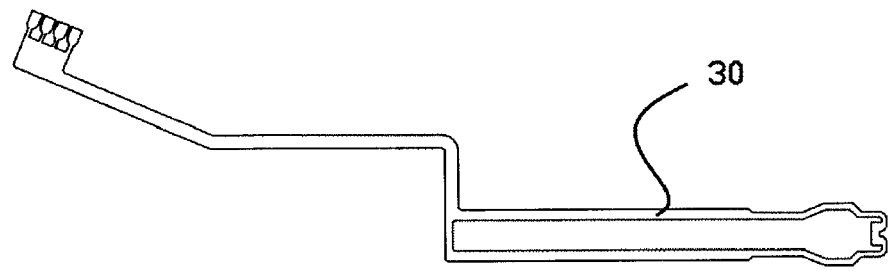

Conductor layer 32, shown in FIG. 2C, includes traces 36, typically made of copper, copper alloy or other conductive material, extending between terminal pads 38 at tail region 26 and head bond pads 40 at gimbal region 24. Traces 36, comprised of reader traces 35 and writer traces 37, carry electrical signals between the disk drive circuitry and magnetic head transducer for reading and writing data to the storage disk.

Figure 2A:
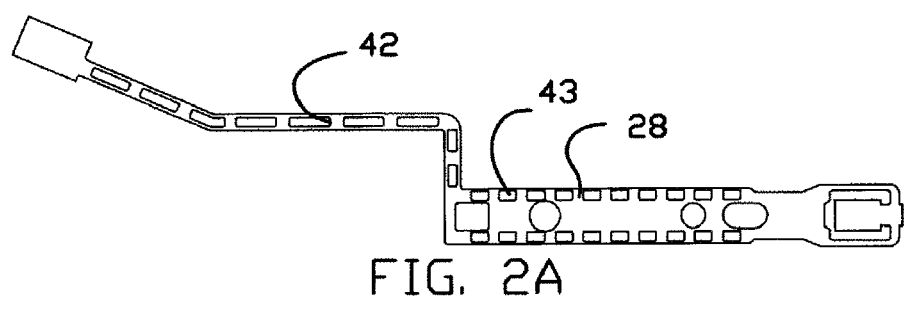

FIG. 2A shows spring metal layer 28, typically made of stainless steel, having one or more spring metal windows 42 in tail region 26 and one or more spring metal windows 43 in base region 22. While spring metal windows 42 and 43 are shown in both tail region 26 and base region 22, spring metal windows 42 only in the tail region 26 or spring metal windows 43 only in base region 22 are contemplated as well. Tail region spring metal windows 42 and base region spring metal windows 43 can be completely through or partially through the thickness of spring metal layer 28 and are typically formed by etching, stamping, laser ablation or other known methods.

Windows 42 and 43, as shown in FIG. 2A, are adjacent to and extend along a substantial portion of the length of traces 36 in tail region 26 and base region 22. The extent and location of spring metal windows 42 and 43 can be tailored to optimize signal performance characteristics of the traces. In one embodiment, spring metal windows 42 and 43 are adjacent to about 50% of the length of the traces 36 in tail region 26 and base region 22. In another embodiment, windows 42 and 43 are adjacent to about at least about 70% of the length of the traces 36 in the tail region 26 and base region 22. It is also contemplated to have windows 42 and 43 adjacent to a substantial portion of only the reader traces 35 or writer traces 37.

FIG. 2D shows coverlay 34 having coverlay structure 10 including one or more coverlay windows 44 in tail region 26 and one or more coverlay windows 45 in base region 22. Coverlay 34 is typically a photosensitive insulative polymer material, such as acrylic or polyimide, and windows 44 and 45 are formed using known photolithography and etching processes. While coverlay windows 44 and 45 are shown in both tail region 26 and base region 22, coverlay windows 44 only in the tail region 26 or coverlay windows 45 only in the base region 22 are contemplated as well.

Tail region coverlay windows 44 extend along a substantial portion of the length of tail region spring metal windows 42. Coverlay windows 44 are adjacent to and generally aligned in the z-axis direction of spring metal windows 42. Base region coverlay windows 45 extend along a substantial portion of the length of base region spring metal windows 43. Coverlay windows 45 are adjacent to and generally aligned in the z-axis direction of spring metal windows 43. The extent and location of coverlay windows 44 and 45 can be tailored to optimize signal performance characteristics of the traces and protect the traces during subsequent assembly operations. In one embodiment, to optimize impedance, coverlay windows 44 and 45 generally have the same size and location as spring metal windows 42 and 43 except in areas where coverlay 34 is needed to protect the traces 36 (e.g. the ratio of coverlay to spring metal windows is essentially 1:1). In another embodiment, to increase bandwidth, coverlay windows 44 and 45 are adjacent to more than 100% of the length of the tail region spring metal windows 42 and base region spring metal windows 43 except where coverlay 34 is needed to protect traces 36 (e.g. ratio of coverlay windows to spring metal windows is greater than 1:1). In still another embodiment, coverlay windows 44 and 45 are adjacent to at least about 90% of the length of the tail region spring metal windows 42 and base region spring metal windows 43 except where coverlay 34 is needed to protect traces 36 (e.g. ratio of coverlay windows to spring metal windows is less than 1:1).

Figure 3:
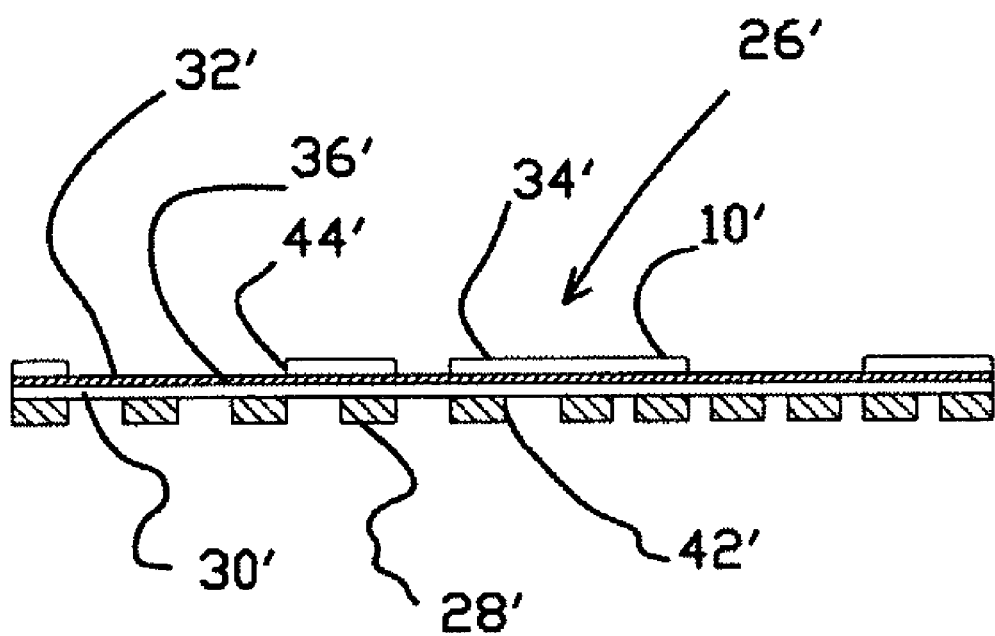
FIG. 3 is a cross sectional view of an alternate embodiment of the coverlay structure of the present invention.

FIG. 3 shows a cross section of tail region 26' having alternate coverlay structure 10'. Tail region 26' includes spring metal layer 28', insulating layer 30', conductor layer 32' and coverlay 34'. Spring metal layer 28' includes one or more tail region spring metal windows 42' adjacent to traces 36'. Coverlay structure 10' includes one or more coverlay windows 44' extending across a plurality of spring metal windows 42'. While FIG. 3 shows an alternate coverlay structure 10' in the tail region 26', a similar coverlay structure 10' is also contemplated in base region 22'.

Figure 4:
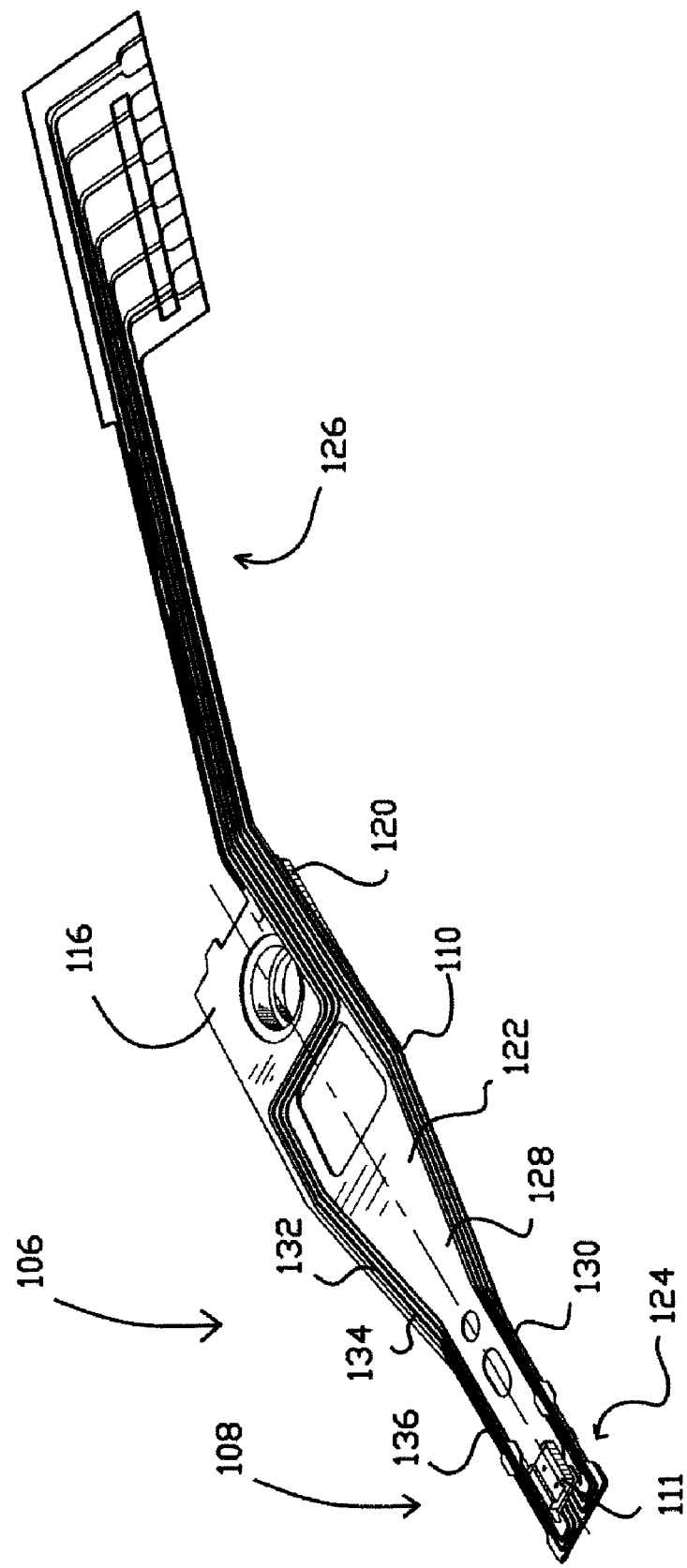
FIG. 4 is an isometric view of an integrated lead head suspension having a flexure integral with the load beam in accordance with an alternate embodiment of the present invention.

FIG. 4 shows an integrated lead head suspension 106 incorporating flexure 108 having coverlay structure 110 in accordance with an alternate embodiment of the present invention. Head suspension 106 includes mounting region 116, base region 122, gimbal region 124 extending from base region 122 and tail region 126 extending from base region 122 opposite gimbal region 124. A base plate 120 is welded or otherwise attached to mounting region 116. A magnetic head slider 111 is mounted to gimbal region 124.

Head suspension 106, shown in exploded view FIGS. 5A-D, is comprised of a spring metal layer 128, an insulating layer 130 on a side of the spring metal layer, a conductor layer 132 on the side of insulating layer 130 opposite spring metal layer 128 and a coverlay 134 on the side of the conductor layer 132 opposite insulating layer 130.

Conductor layer 132, shown in FIG. 5C, includes traces 136, typically made of copper, copper alloy or other conductive material, extending between terminal pads 138 at tail region 126 and head bond pads 140 at gimbal region 124. Traces 136, comprised of reader traces 135 and writer traces 137, carry electrical signals between the disk drive circuitry and magnetic head transducer 111 for reading and writing data to the storage disk.

FIG. 5A shows spring metal layer 128, typically made of stainless steel, having one or more spring metal windows 142 in tail region 126 and one or more spring metal windows 143 in base region 122. While spring metal windows 142 and 143 are shown in both tail region 126 and base region 122, spring metal windows 142 only in the tail region 126 or spring metal windows 143 only in base region 122 are contemplated as well. Tail region spring metal windows 142 and base region spring metal windows 143 can be completely through or partially through the thickness of spring metal layer 128 and are typically formed by etching, stamping, laser ablation or other known methods.

Windows 142 and 143, as shown in FIG. 5A, are adjacent to and extend along a substantial portion of the length of writer traces 137 in tail region 126 and base region 122. The extent and location of spring metal windows 142 and 143 can be tailored to optimize signal performance characteristics of the traces. In one embodiment, spring metal windows 142 and 143 are adjacent to about 50% of the length of the traces 137 in tail region 126 and base region 122. In another embodiment, windows 142 and 143 are adjacent to at least about 70% of the length of the traces 137 in the tail region 126 and base region 122. While windows 142 and 143 are shown adjacent to writer traces 137, it is also contemplated to have windows 142 and 143 adjacent to a substantial portion of reader traces 135 or both reader traces 135 and writer traces 137.

FIG. 5D shows coverlay structure 110 having one or more coverlay windows 144 in tail region 126 and one or more coverlay windows 145 in base region 122. Coverlay 134 is typically a photosensitive insulative polymer material, such as acrylic or polyimide, and windows 144 and 145 are formed using known photolithography and etching processes. While coverlay windows 144 and 145 are shown in both tail region 126 and base region 122, coverlay windows 144 only in the tail region 126 or coverlay windows 145 only in the base region 122 are contemplated as well.

Tail region coverlay windows 144 extend along a substantial portion of the length of tail region spring metal windows 142. Coverlay windows 144 are adjacent to and generally aligned in the z-axis direction of spring metal windows 142. Base region coverlay windows 145 extend along a substantial portion of the length of base region spring metal windows 143. Coverlay windows 145 are adjacent to and generally aligned in the z-axis direction of spring metal windows 143. The extent and location of coverlay windows 144 and 145 can be tailored to optimize signal performance characteristics of the traces and protect the traces during subsequent assembly operations. In one embodiment, to optimize impedance, coverlay windows 144 and 145 generally have the same size and location as spring metal windows 142 and 143 except in areas where coverlay 134 is needed to protect the traces 136 (e.g. the ratio of coverlay to spring metal windows is essentially 1:1). In another embodiment, to increase bandwidth, coverlay windows 144 and 145 are adjacent to more than 100% of the length of the tail region spring metal windows 142 and base region spring metal windows 143 except where coverlay 134 is needed to protect traces 136 (e.g. ratio of coverlay windows to spring metal windows is greater than 1:1). In still another embodiment, coverlay windows 144 and 145 are adjacent to at least about 90% of the length of the tail region spring metal windows 142 and base region spring metal windows 143 except where coverlay 134 is needed to protect traces 136 (e.g. ratio of coverlay windows to spring metal windows is less than 1:1).

Although the present invention has been described with reference to preferred embodiments, those skilled in the art will recognize that changes can be made in form and detail without departing from the spirit and scope of the invention.

What is claimed is:

1. A flexure for attachment to a load beam of the type having a beam region, a mounting region and a hinge region between the beam and mounting regions, the flexure including a spring metal layer, a dielectric insulating layer on a side of the spring metal layer, a conductor layer on the side of the insulating layer opposite the spring metal layer, a coverlay on the side of the conductor layer opposite the insulating layer, a base region, a gimbal region extending from the base region, and a tail region extending from the base region opposite the gimbal region, comprising:

terminal pads in the conductor layer at the tail region;

head bond pads in the conductor layer at the gimbal region;

traces in the conductor layer extending between the terminal pads and the head bond pads across the tail region, base region and gimbal region;

one or more spring metal windows in the spring metal layer at the tail region, the tail region spring metal windows adjacent to at least about 50% of the length of the traces at the tail region; and one or more coverlay windows in the coverlay at the tail region, the tail region coverlay windows having generally the same size and location as the tail region spring metal windows.

2. The flexure of claim 1 wherein the tail region spring metal windows and the tail region coverlay windows are adjacent to writer traces.

3. The flexure of claim 2 wherein portions of the stainless steel layer and the coverlay at the tail region adjacent to some of the traces extending across the tail region are free from substantial windows.

4. The flexure of claim 1 wherein:

the tail region coverlay windows are adjacent to at least about 90% of the length of the tail region spring metal windows.

5. The flexure of claim 1 and further including:

one or more spring metal windows in the spring metal layer at the base region, the base region spring metal windows adjacent to at least a substantial portion of at least some of the traces at the base region; and one or more windows in the coverlay at the base region, the base region coverlay windows adjacent to at least substantial portions of the base region spring metal windows.

6. The flexure of claim 5 wherein:

the base region spring metal windows are adjacent to at least about 50% of the length of the traces at the base region; and the base region coverlay windows have generally the same size and location as the base region spring metal windows.

7. The flexure of claim 5 wherein the base region spring metal windows and the base region coverlay windows are adjacent to writer traces.

8. The flexure of claim 7 wherein portions of the stainless steel layer and the coverlay at the base region adjacent to some of the traces extending across the base region are free from substantial windows.

9. The flexure of claim 5 wherein:

the base region spring metal windows are adjacent to at least about 50% of the length of the traces at the base region, and the base region coverlay windows are adjacent to at least about 90% of the length of the base region spring metal windows.

10. The flexure of claim 1 wherein the spring metal windows are substantially aligned with the coverlay windows.

11. The flexure of claim 1 wherein at least one of the coverlay windows extends across a plurality of spring metal windows.

12. An integrated lead suspension of the type having traces extending across a spring metal layer at a tail region, a base region and a gimbal region, and a coverlay on a side of the traces opposite the spring metal layer, including:

tail region spring metal windows in the spring metal layer adjacent to at least about 50% of the length of the traces at the tail region; and tail region coverlay windows in the coverlay having generally the same size and location as the tail region spring metal windows.

13. The suspension of claim 12 wherein the tail region spring metal windows and the tail region coverlay windows are adjacent to writer traces.

14. The suspension of claim 13 wherein portions of the stainless steel layer and the coverlay at the tail region adjacent to some of the traces extending across the tail region are free from substantial windows.

15. The suspension of claim 12 wherein:

the tail region coverlay windows are adjacent to at least about 90% of the length of the tail region spring metal windows.

16. The suspension of claim 12 and further including:

one or more spring metal windows in the spring metal layer at the base region, the base region spring metal windows adjacent to at least a substantial portion of at least some of the traces at the base region; and one or more windows in the coverlay at the base region, the base region coverlay windows adjacent to at least substantial portions of the base region spring metal windows.

17. The suspension of claim 16 wherein:

the base region spring metal windows are adjacent to at least about 50% of the length of the traces at the base region; and the base region coverlay windows have generally the same size and location as the base region spring metal windows.

18. The suspension of claim 16 wherein the base region spring metal windows and the base region coverlay windows are adjacent to writer traces.

19. The suspension of claim 18 wherein portions of the stainless steel layer and the coverlay at the base region adjacent to some of the traces extending across the base region are free from substantial windows.

20. The suspension of claim 16 wherein:

the base region spring metal windows are adjacent to at least about 50% of the length of the traces at the base region, and the base region coverlay windows are adjacent to at least about 90% of the length of the base region spring metal windows.

21. The suspension of claim 12 wherein the spring metal windows are substantially aligned with the coverlay windows.

22. The suspension of claim 12 wherein at least one of the coverlay windows extends across a plurality of spring metal windows.

* * * * *